United States Patent
Nakata et al.

(10) Patent No.: US 7,743,364 B2
(45) Date of Patent: Jun. 22, 2010

(54) WORK FLOW MANAGEMENT SYSTEM, WORK FLOW MANAGEMENT APPARATUS AND METHOD

(75) Inventors: Hironobu Nakata, Itami (JP); Masakazu Murakami, Itami (JP); Kazumi Sawayanagi, Itami (JP); Minako Kobayashi, Ikeda (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1198 days.

(21) Appl. No.: 11/164,238

(22) Filed: Nov. 15, 2005

(65) Prior Publication Data

US 2007/0028207 A1  Feb. 1, 2007

(30) Foreign Application Priority Data

Jul. 26, 2005 (JP) ............................. P2005-215371

(51) Int. Cl.
    *G06F 9/44* (2006.01)
(52) U.S. Cl. .................... 717/122; 717/121; 717/123
(58) Field of Classification Search .................. None
    See application file for complete search history.

(56) References Cited

U.S. PATENT DOCUMENTS

| | | | |
|---|---|---|---|
| 6,038,541 A | 3/2000 | Tokuda et al. | |
| 6,104,468 A | 8/2000 | Bryniarski et al. | |
| 6,337,748 B1 | 1/2002 | Murata et al. | |
| 6,411,314 B1 | 6/2002 | Hansen et al. | |
| 6,860,422 B2 | 3/2005 | Hull et al. | |
| 2003/0154115 A1* | 8/2003 | Lahey et al. | ................... 705/8 |

FOREIGN PATENT DOCUMENTS

| | | |
|---|---|---|
| JP | 2003-345954 | 12/2003 |
| JP | 2004-288041 | 10/2004 |
| JP | 2005-078160 | 3/2005 |

OTHER PUBLICATIONS

Notification of Reason(s) for Refusal in JP 2005-215371 dated Nov. 18, 2008, and a English Translation thereof.

* cited by examiner

*Primary Examiner*—Chuck O Kendall
(74) *Attorney, Agent, or Firm*—Buchanan Ingersoll & Rooney PC

(57) ABSTRACT

A work flow management system, a work flow management apparatus and a management method capable of managing the work flow through a plurality of devices are provided. The work flow management system includes a work flow management apparatus, and the desired job history information included in the job history information having the performance information of the job executed by the device in accordance with the work flow information is acquired from the device based on the job ID specifying the job. Even with the work flow through a plurality of devices, therefore, the job history information can be acquired thereby to manage the work flow.

15 Claims, 16 Drawing Sheets

Fig.7

| WORK FLOW ID | MACHINE ID_1 | MACHINE ID_2 | MACHINE ID_3 |
|---|---|---|---|
| F-001 | PC_A | MFP-001 | MFP-002 |
| F-002 | MFP-101 | MFP-102 | |
| F-003 | MFP-201 | MFP-301 | MFP-401 |

Fig.8A

| JOB INFORMATION ITEM | JOB CONTENTS | PROCESSING CONTENTS 1 | PROCESSING CONTENTS 2 | PROCESSING CONTENTS 3 | PROCESSING CONTENTS 4 | PROCESSING CONTENTS 5 |
|---|---|---|---|---|---|---|
| WORK FLOW ID | FLOW ID = F-001 | | | | | |
| EXECUTION DEVICE | MFP102-1(MACHINE ID=MFP-001) | | | | | |
| DOCUMENT NAME | aaa.Doc | | | | | |
| PROCESSING CONTENTS | PC PRINT | 5 COPIES | BOTH SIDES | A4 | COLOR | PRINT DATE |
| | FORMAT CONVERSION | CompactPDF | | | | |
| | TRANSMIT | E-Mail | | | | |
| | | To MFP B | | | | |

Fig.8B

| JOB INFORMATION ITEM | JOB CONTENTS | PROCESSING CONTENTS 1 | PROCESSING CONTENTS 2 | PROCESSING CONTENTS 3 | PROCESSING CONTENTS 4 | PROCESSING CONTENTS 5 |
|---|---|---|---|---|---|---|
| WORK FLOW ID | FLOW ID = F-001 | | | | | |
| EXECUTION DEVICE | MFP102-2(MACHINE ID=MFP-002) | | | | | |
| DOCUMENT NAME | aaa.Doc | | | | | |
| PROCESSING CONTENTS | PC PRINT | 3 COPIES | ONE SIDE | A4 | MONOCHROMATIC | PRINT DATE |
| | FORMAT CONVERSION | — | | | | |
| | TRANSMIT | — | | | | |

Fig.9

|  | 152 WORK FLOW ID | 151 MACHINE ID_1 / 154 JOB ID | MACHINE ID_2 JOB ID | MACHINE ID_3 JOB ID |
|---|---|---|---|---|
| 153 → | F-001 | PC_A | MFP-001 | MFP-002 |
|  |  | 001 | 001 | 003 |
|  | F-002 | MFP-101 | MFP-102 |  |
|  |  | 011 | 012 |  |
|  | F-003 | MFP-201 | MFP-301 | MFP-401 |
|  |  | 090 | 091 |  |

Fig.10

| 154 JOB ID | 152 WORK FLOW ID | 156 DESTINATION | THE NUMBER OF PAGES | RESULT | MACHINE ID |
|---|---|---|---|---|---|
| 001 | F-001 | 150.16.172.201 | 2 | OK | MFP-001 |
| 002 | --- | 072-772-XXXX | 2 | OK | MFP-001 |
| 003 | --- | asdf@sample | 2 | OK | MFP-001 |

157

_US 7,743,364 B2_

WORK FLOW MANAGEMENT SYSTEM, WORK FLOW MANAGEMENT APPARATUS AND METHOD

This application is based on an application No. 2005-215371 filed on Jul. 26, 2005 in Japan, the contents of which is hereby incorporated by reference.

BACKGROUND OF THE INVENTION

1. Field of the Invention

This invention relates to a work flow management system, a work flow management apparatus and method for managing the work flow.

2. Description of the Related Art

The work flow technique is the one whereby the job flow, i.e. the work flow is controlled by a computer system to proceed with the job. In the facsimile device, for example, a facsimile communication unit in the facsimile device receives a facsimile letter, a network communication unit in the facsimile device receives an electronic mail and other information, or a series of various other processes are executed in response to instructions issued from an operating unit in the facsimile device. The series of the processes thus executed can be considered as the work flow.

As for a management apparatus for managing the work flow as above, Japanese Unexamined Patent Publication No. 2003-345954 proposes a technique in which a work flow management apparatus, which is independent and not connected with other devices, permits the information on the processes described above to be acquired from the work flow information. Specifically, Japanese Unexamined Patent Publication No. 2003-345954 discloses a technique to store a history of the work flow configured of a plurality of processes and a history of each process, and access a history of an individual process from the work flow history and the histories of the processes before and after the individual process. The technique disclosed in Japanese Unexamined Patent Publication No. 2003-345954 facilitates to manage the history of each process individually which is executed in the independent apparatus not connected with other devices.

In the conventional techniques for history management of the various processes in the work flow including the technique disclosed in Japanese Unexamined Patent Publication No. 2003-345954, the history of a process is managed only by the device that has executed the process. In the case where a plurality of devices are connected by LAN, etc. and the work flow is configured of a plurality of processes executed through a plurality of devices in the LAN, therefore, the completion of the work flow cannot be confirmed and the history of the work flow, i.e. how the work flow is executed through which device, or the like cannot be acquired. Further, it is impossible to acquire the detailed information on each job in the work flow.

SUMMARY OF THE INVENTION

This invention has been achieved to solve the above problems, and the object thereof is to provide a work flow management system, a work flow management apparatus and a work flow management method capable of managing the work flow through a plurality of devices.

In order to achieve this object, the present invention is configured to as follows.

That is, according to a first aspect of the invention, there is provided a work flow management system comprising:

a plurality of devices connected to a network; and a work flow management apparatus connected to the network and configured to manage a work flow which causes the devices to perform a job in collaboration with each other in accordance with work flow information;

the work flow management apparatus including a job history information acquisition section configured to acquire job history information based on a job ID specifying the job, the job history information containing performance information of the job performed by the devices in accordance with the work flow information.

With this configuration, the job history information acquisition section acquires the job history information based on the job ID. Therefore, it does not matter in the acquisition of the job history information that either the devices can acquire the job history information extracted on the basis of the job ID or the work flow management apparatus can acquire the desired job history information based on the job ID out of the job history information which are acquired from the devices.

The work flow management system may be designed so that each of the devices includes a job history information storage section configured to store the job history information in a state that the performance information of the job performed in accordance with the work flow information and the job ID specifying the performed job are brought into connection with each other, and to be accessible from the work flow management apparatus; and the work flow management apparatus includes a work flow history information storage section configured to store work flow history information formed by adding the job ID specifying the job performed by each of the devices to the work flow information, and to be read the job ID by the job history information acquisition section.

With this configuration, each device includes the job history information storage section for storing the job history information having the job ID, and each job history information storage section is accessible by the work flow management apparatus. The work flow management apparatus, therefore, can acquire the job IDs from the job history information storage sections.

The work flow management system may be designed so that each of the devices further includes a job history information preparation section configured to prepare the job history information, a job ID preparation section configured to prepare the job ID, and a job ID transmitting unit configured to transmit the prepared job ID to the work flow management apparatus; and the work flow management apparatus further includes a work flow history information preparation section configured to prepare the work flow history information by adding the job ID sent from the job ID transmitting unit to the work flow information.

The work flow management system may be designed so that the work flow management apparatus includes a job history information requesting section configured to transmit the job ID to each of the devices, and each of the devices further includes a job history information extracting section configured to extract the job history information having the job ID from the job history information storage section in accordance with a job history information acquisition request sent from the work flow management apparatus, and a job history information transmitting unit configured to transmit the extracted job history information to the work flow management apparatus.

The work flow management system may be designed so that the work flow management apparatus further includes a select information transmitting section configured to transmit select information contained in the work flow history information to each of the devices.

The work flow management system may be designed so that each of the devices further includes a job determining section configured to determine whether or not the job to be executed corresponds to the work flow information in accordance with presence or absence of a work flow ID specifying the work flow.

The work flow management system may be designed so that each of the devices further includes a storage control section configured to store the work flow ID to the job history information storage section with the work flow ID corresponded to the job history information when each the device performs the job in accordance with the work flow information.

The work flow management system may be designed so that each of the devices includes a job history information transmitting unit configured to transmit the job history information to the job history information acquisition section in accordance with job history information acquisition request sent from the work flow management apparatus, and the job history information acquisition section extracts the job history information having the job ID from the received job history information.

With this configuration, the job history information transmitting units included in the devices transmit the job history information to the work flow management apparatus. The work flow management apparatus acquires the desired job history information based on the transmitted job history information or the job ID.

The work flow management system may be designed so that the job history information acquisition section further includes a selecting section configured to select job history information having select information contained in work flow history information from the received job history information, and retrieve job history information having the job ID from the selected job history information.

The select information may be at least one of a machine ID specifying each the device and a work flow ID specifying the work flow.

According to a second aspect of the invention, there is provided a work flow management apparatus connected to a network and configured to manage a work flow in which a plurality of devices connected to the network perform a job in collaboration with each other, comprising:

a work flow history information storage section configured to store work flow history information formed by adding a job ID specifying the job performed by each of the devices to work flow information in accordance with the work flow information having a machine ID specifying each of the devices and a work flow ID specifying the work flow to be executed, a job history information storage section configured to store job history information having performance information of the job performed by each of the devices, and a job history information acquisition section configured to acquire desired job history information from the job history information storage section on a basis of the job ID contained in the work flow history information.

According to a third aspect of the invention, there is provided a work flow management method for managing a work flow which causes a plurality of devices connected to a network to perform a job in collaboration with each other, comprising:

causing each of the devices to perform a job in accordance with work flow information through a management apparatus;

storing, in each of the devices performing the job, job history information having a job ID which specifies each performed job and performance information specified by the job ID;

transmitting the job ID to the management apparatus from each of the devices;

storing work flow history information formed by adding the job ID to the work flow information in the management apparatus; and acquiring desired job history information from the job history information stored in each of the devices on a basis of the job ID contained in the work flow history information in the management apparatus.

In the third aspect, the method may be designed so that, when the desired job history information is acquired, the method further comprises:

selecting a device for acquiring the job history information based on a machine ID contained in the work flow history information and specifying the device, and acquiring the job history information having a designated job ID from the selected device.

In the third aspect, the method may be designed so that each of the devices determines whether or not the job performed by each device is a job for the work flow information in accordance with presence or absence of a work flow ID contained in the work flow information and specifying the work flow, and stores the work flow ID to bring the work flow ID into correspondence with the job history information in a case where the job to be performed is a job for the work flow information.

In the third aspect, the method may be designed so that, when the desired job history information is acquired, the method further comprises:

selecting a device for acquiring the job history information based on the work flow ID contained in the work flow history information; and acquiring the job history information having a designated job ID from the device selected in accordance with the machine ID and the work flow ID.

In the work flow management system according to the first aspect of the invention, the work flow management apparatus according to the second aspect of the invention, and the work flow management method according to the third aspect of the invention, the work flow management apparatus has the job IDs, and therefore can acquire the history information on the jobs executed by a plurality of devices based on the job IDs. Thus, the work flow history indicating how the work flow is executed through which device can be acquired.

BRIEF DESCRIPTION OF THE DRAWINGS

FIG. 7 is a diagram for explaining the work flow information used in the work flow management apparatus shown in FIG. 1.

FIG. 8A is a diagram for explaining the work flow used in the work flow management apparatus shown in FIG. 1.

FIG. 8B is a diagram for explaining the work flow used in the work flow management apparatus shown in FIG. 1.

FIG. 9 is a diagram for explaining the work flow history information used in the work flow management apparatus shown in FIG. 1.

FIG. 10 is a diagram for explaining the job history information prepared in the devices shown in FIG. 1.

DETAILED DESCRIPTION OF THE PREFERRED EMBODIMENTS

Figure 1:
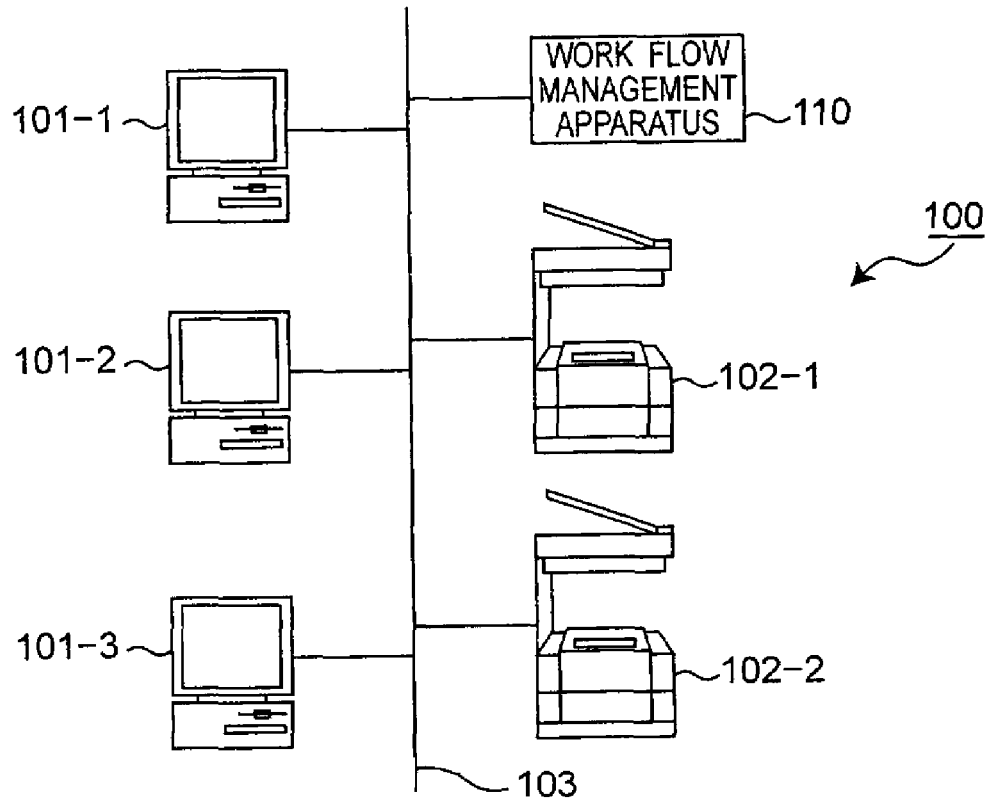
FIG. 1 is a diagram showing a general configuration of a work flow management system according to an embodiment of the invention.

A work flow management system, a work flow management apparatus included in the system, and a work flow management method executed by the work flow management system according to embodiments of the invention are explained below with reference to the drawings. In each drawing, the same or equivalent component parts are designated by the same reference numerals, respectively.

As shown in FIG. 1, a work flow management system 100 according to the embodiment has a configuration including a single work flow management apparatus 110 and a plurality of devices connected to a network 103 such as LAN respectively. According to this embodiment, the devices include as an example of information processing terminals one or a plurality of personal computers 101-1 to 101-3 (hereinafter sometimes collectively referred to as the personal computer or PC 101) and one or a plurality of MFPs (multifunction peripherals) 102-1 to 102-2 (hereinafter sometimes collectively referred to as MFP 102). The MFP 102 is a machine called as a composite machine or the like, that all the functions of the copier, network printer, scanner, fax, and the document server, etc. are integrated into one machine. Devices making up the management system 100 are not limited to the PC 101 and the MFP 102. At least one of the PC 101 and the MFP 102 may hereinafter be referred to as the device 101 and/or 102.

In the work flow management system 100, the personal computer 101 and the MFP 102 execute one or a plurality of jobs in collaboration with each other to achieve one work flow. The job is defined as an element making up the work flow and a unit of work as viewed from the user. Each job, therefore, may has one or a plurality of processes. In a case where the user designates the operation of copying, faxing and storing a document, for example, three processes of copying, faxing and storing correspond to one job.

The work flow management apparatus 110 is explained. The work flow management apparatus 110 is a apparatus managing the work flow in which a plurality of the devices 101 and 102 of the management system 100 perform a plurality of jobs in collaboration with each other. Specifically, the work flow management apparatus 110 manages histories of the work flows including mode and status for execution of the work flow, i.e. how the work flow is executed through which devices, for the work flow to be executed by a plurality of the devices 101 and 102 as described above. In order to manage the work flow, each of the work flow management apparatus 110 and the devices 101 and 102 has a unique machine ID and recognizes it. The work flow management apparatus 110 also recognizes the machine IDs of the devices 101 and 102.

According to this embodiment, as shown in FIG. 1, the work flow management apparatus 110 is configured, though not always, as an independent entity on the network 103. Configurations and functions of the work flow management apparatus 110 described below can be associated with one MFP 102, or a part of the configurations and the functions of the work flow management apparatus 110 can be distributed among the MFP(s) 102 and the personal computer(s) 101. In such cases, the independent work flow management apparatus 110 can be eliminated from the work flow management system 100.

Figure 2:
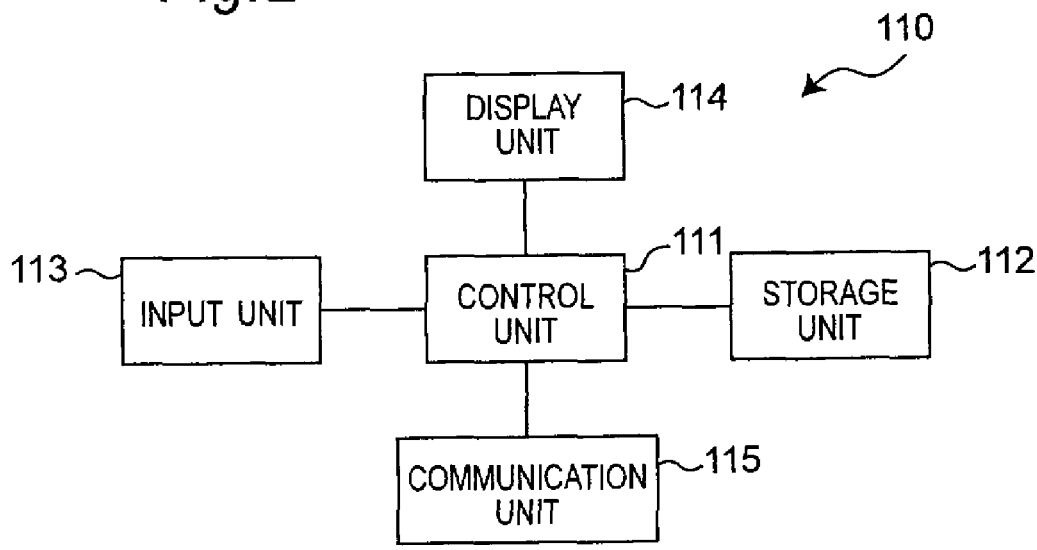
FIG. 2 is a block diagram showing a general configuration of the work flow management apparatus shown in FIG. 1.

The work flow management apparatus 110 roughly includes, as shown in FIG. 2, a control unit 111, a storage unit 112, an input unit 113, a display unit 114 and a communication unit 115. The following explanation of the work flow management operation as an operation and functions of the work flow management apparatus 110 can be interpreted as the explanation of the work flow management program stored in the storage unit 112 and executed by the control unit 111.

Figure 3:
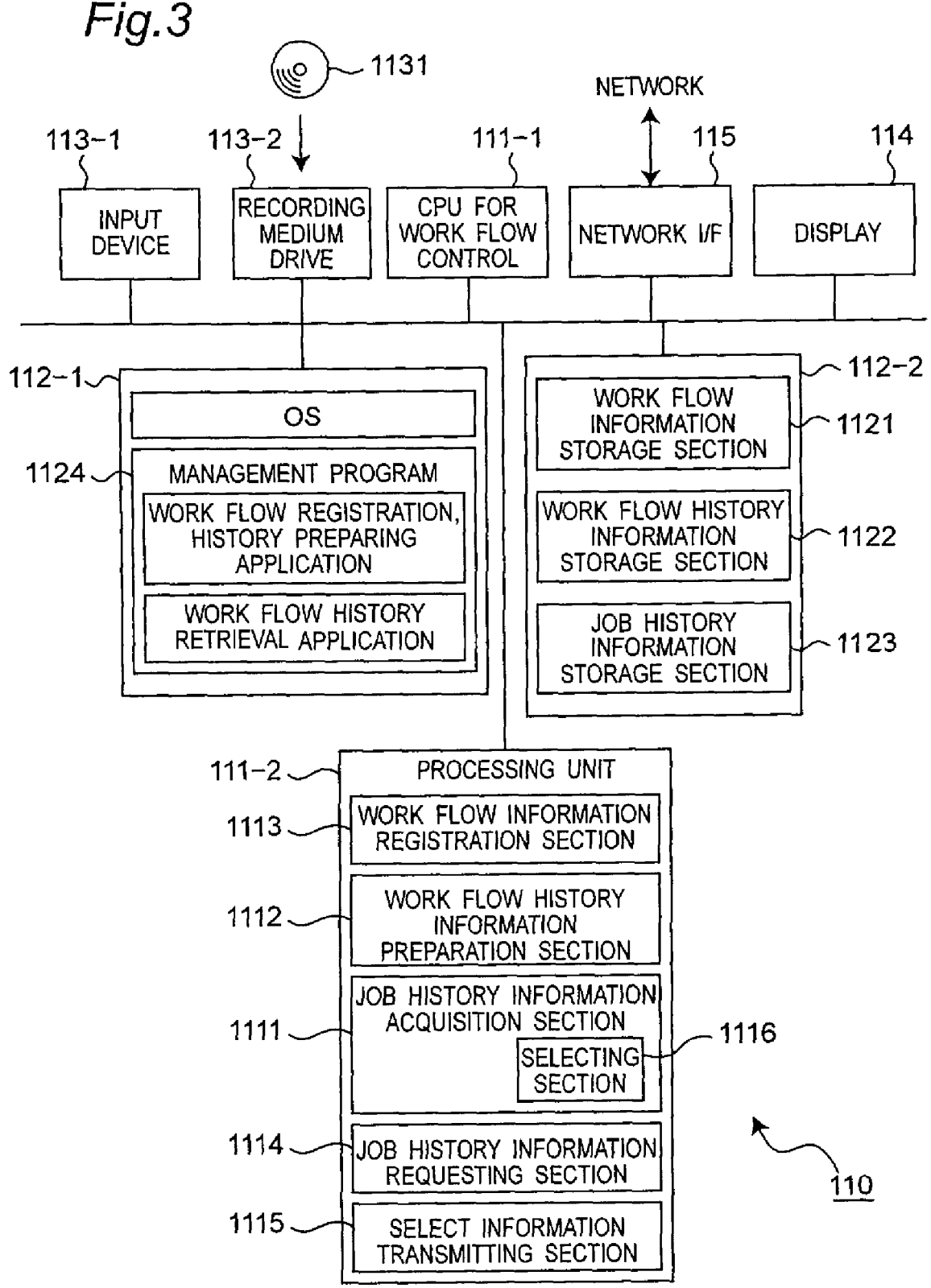
FIG. 3 is a diagram showing a configuration implemented using a CPU as the control unit in FIG. 2.

The configuration of the work flow management apparatus 110 implemented by using a CPU (central processing unit) as the control unit 111 in FIG. 2 is shown in FIG. 3. In FIG. 3, the CPU 111-1 is connected with a processing unit 111-2, a hard disk drive 112-1 and a ROM/RAM unit 112-2 corresponding to the storage unit 112, an input device 113-1 and a recording medium drive 113-2 corresponding to the input unit 113, a display 114 corresponding to the display unit, and a network I/F 115 corresponding the communication unit. The processing unit 111-2 is divided functionally into a job history information acquisition section 1111, a work flow history information preparation section 1112, a work flow information registration section 1113, a job history information requesting section 1114, and a select information transmitting section 1115. These units are described in detail later. The ROM/RAM unit 112-2 includes a work flow information storage section 1121, a work flow history information storage section 1122 and a job history information storage section 1123. The hard disk drive 112-1 stores therein an operating system (OS) and a work flow management program 1124 including applications for work flow registration and history preparation and an application for retrieving the work flow history as a program to execute the work flow management. The work flow management program 1124 may be stored in the hard disk drive 112-1 in advance or installed into the hard disk drive 112-1 from a recording medium 1131 such as a CD-ROM through the recording medium drive 113-2. Further, the work flow management program 1124 may alternatively be installed through the network I/F 115.

Figure 4:
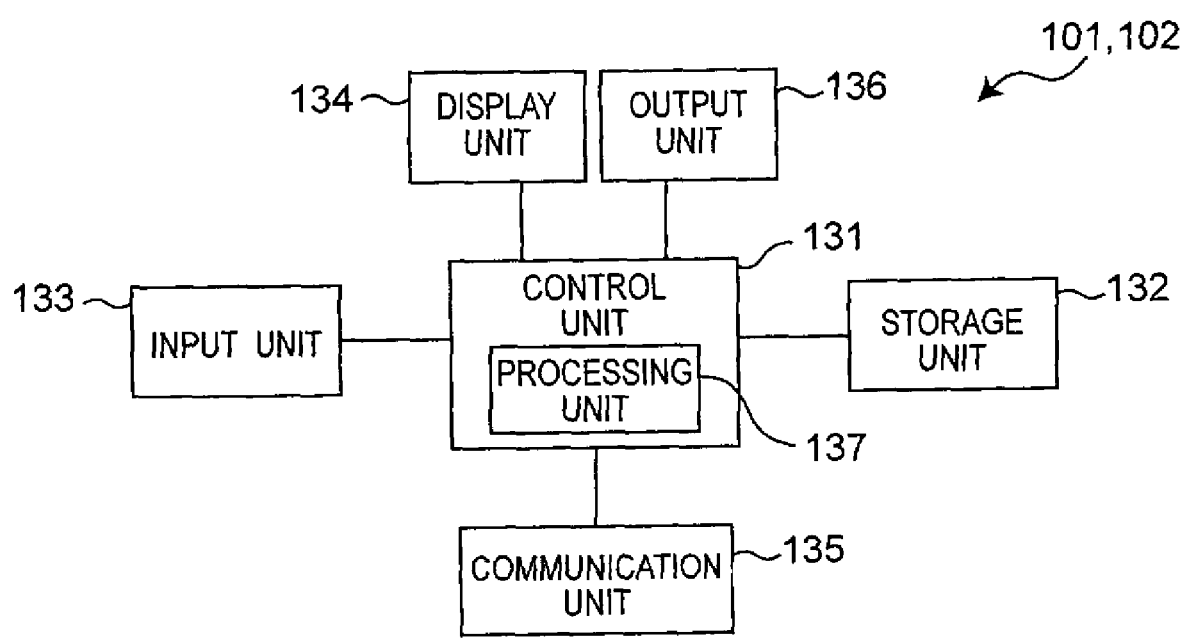
FIG. 4 is a block diagram showing a general configuration of each of the devices shown in FIG. 1.

Next, the devices 101 and 102 are explained. Each of the devices 101 and 102, as shown in FIG. 4, is roughly divided into a control unit 131, a storage unit 132, an input unit 133, a display unit 134, a communication unit 135 and an output unit 136.

Figure 5:
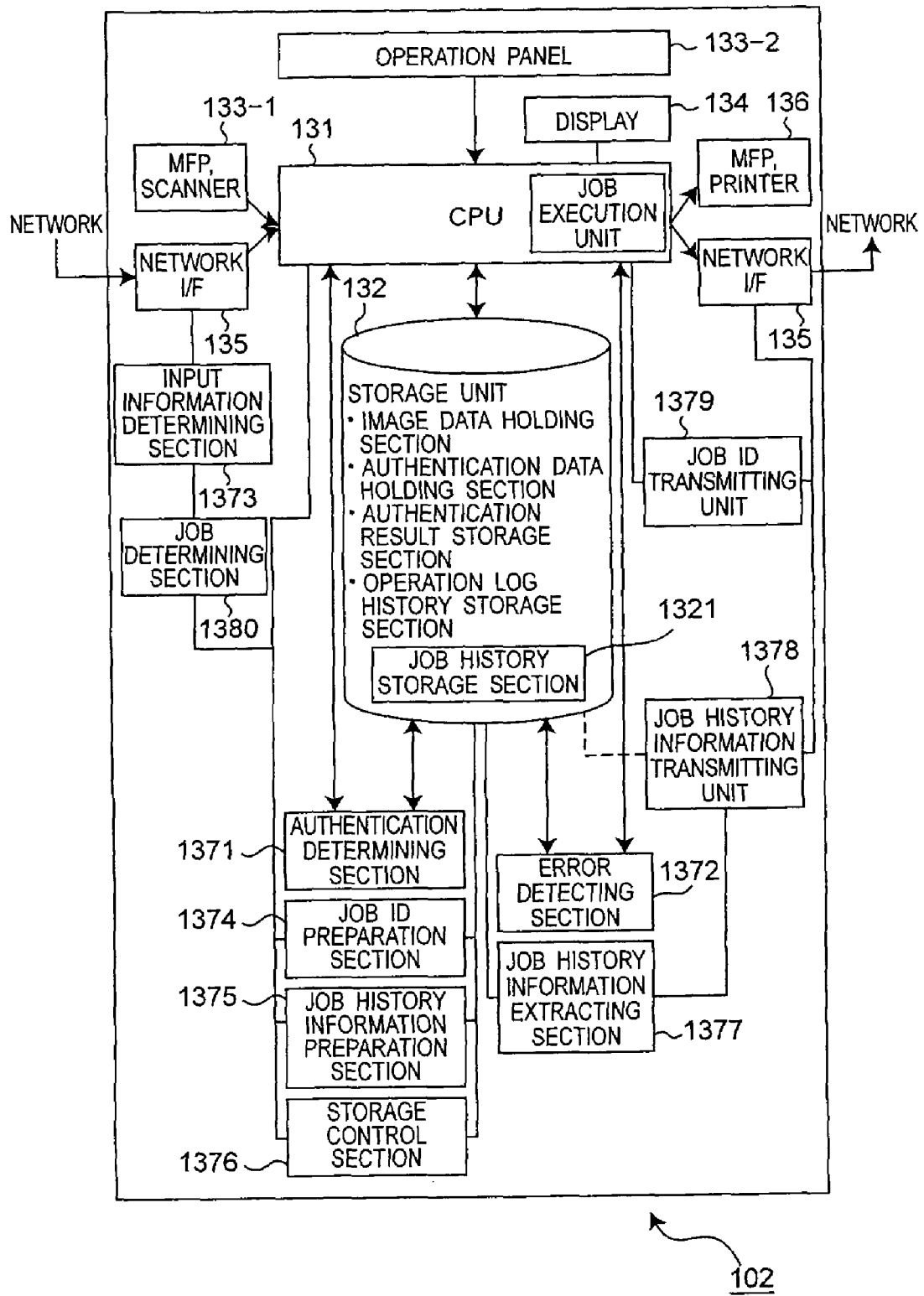
FIG. 5 is a diagram showing a configuration of a MFP implemented using a CPU as the control unit in FIG. 4.

First, the MFP 102 is explained. The configuration of the control unit 131 shown in FIG. 4 which is implemented using a CPU is shown in FIG. 5. As shown in FIG. 5, the CPU 131 making up the control unit of the MFP 102 is connected with a storage unit 132 corresponding to the storage unit and having a job history storage section 1321, a scanner 133-1 and an operation panel 133-2 corresponding to the input unit 133 and making up an image input unit, a display 134 corresponding to the display unit, a network I/F 135 corresponding to the communication unit, and a printer 136 corresponding to the output unit. Further, the CPU 131 is connected with a processing unit 137. The processing unit 137 includes an authentication determining section 1371, an error detecting section 1372, an input information determining section 1373, a job ID preparation section 1374, a job history information preparation section 1375, a storage control section 1376, a job history information extracting section 1377, a job history information transmitting unit 1378, a job ID transmitting unit 1379, and a job determining section 1380. The processing unit 137 is explained in detail later.

The general operation other than the work flow operation of the MFP 102 having the above configuration is explained below. The work flow operation is explained in detail later.

A user ID and a pass word are input from the operation panel 133-2 and these data are sent to the authentication determining section 1371 through the CPU 131. The authentication determining section 1371 reads authentication data from the storage unit 132, and determines whether or not the MFP 102 is available for use by the user. Upon determination that the MFP 102 is not usable, the user cannot use the MFP 102. Upon determination that the MFP is usable, on the other hand, the user can use the MFP 102. By the user operating the MFP 102 on the operation panel 133-2, an image read by the scanner 133-1 is stored in the storage unit 132 through the CPU 131. In a case where the image read by scanning is printed, the image is sent to and printed on the printer 136. Further, in a case where the read image is sent to other devices such as the PC 101 or the like, the image can be transmitted to other devices through the network I/F 135. In a case where the image is sent from the PC 101 and printed on the MFP 102, the user ID and the pass word are input through the PC 101, and together with the image data, supplied to the MFP 102. As described above, the authentication determining section 1371 determines whether or not the user can use the MFP 102, and only in the case where the user can use it, the supplied image data is stored in the storage unit 132 or printed on the printer 136.

Figure 6:
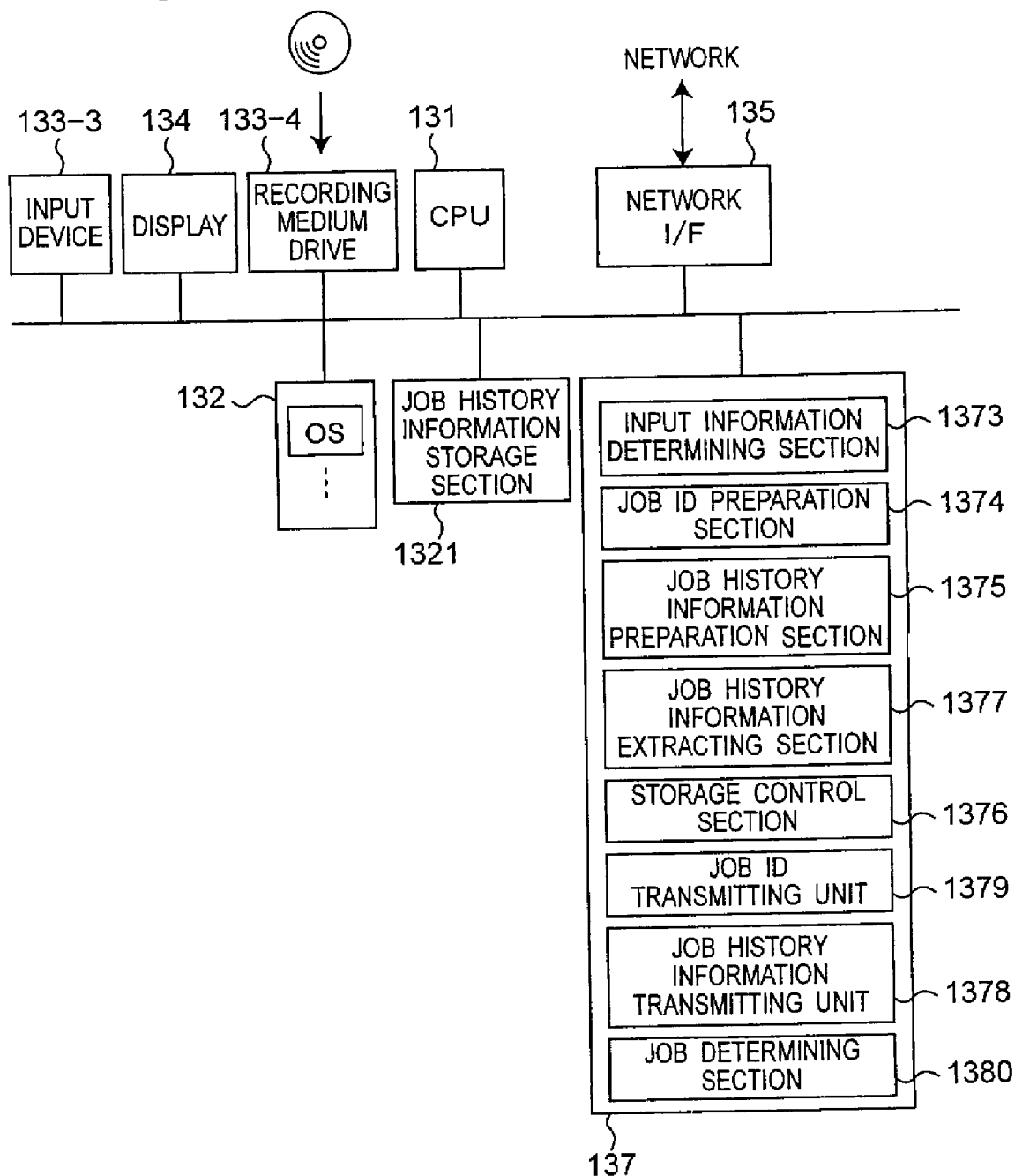
FIG. 6 is a diagram showing a configuration of a PC implemented using a CPU as the control unit in FIG. 4.

The PC 101 is explained. The configuration of the control unit 131 shown in FIG. 4 as implemented using a CPU is shown in FIG. 6. Component parts of the PC 101 for the work flow operation are basically the same as those of the MFP 102. The only difference lies in that the input unit 133 includes an input device 133-3 and a recording medium drive 133-4.

The work flow management method executed in the work flow management system 100 having the above-mentioned configuration is explained separately for the work flow management apparatus 110 and the devices 101 and 102.

First, the operation of the work flow management apparatus 100 is explained. Processes executed in the work flow management apparatus 110 are roughly divided into a work flow information registration process (S200) and a work flow history information preparation process (S210) shown in FIG. 11, and a job history information acquisition process (S220) shown in FIG. 12.

First, the work flow information registration process is explained. In the work flow management apparatus 110 having the configuration described above, registration of work flow information necessary for the work flow operation is required. The work flow information registration process is explained with reference to FIGS. 7 to 9, 11, 12 and 13. FIGS. 7 to 10 show only an example to which the invention is not limited.

Figure 11:
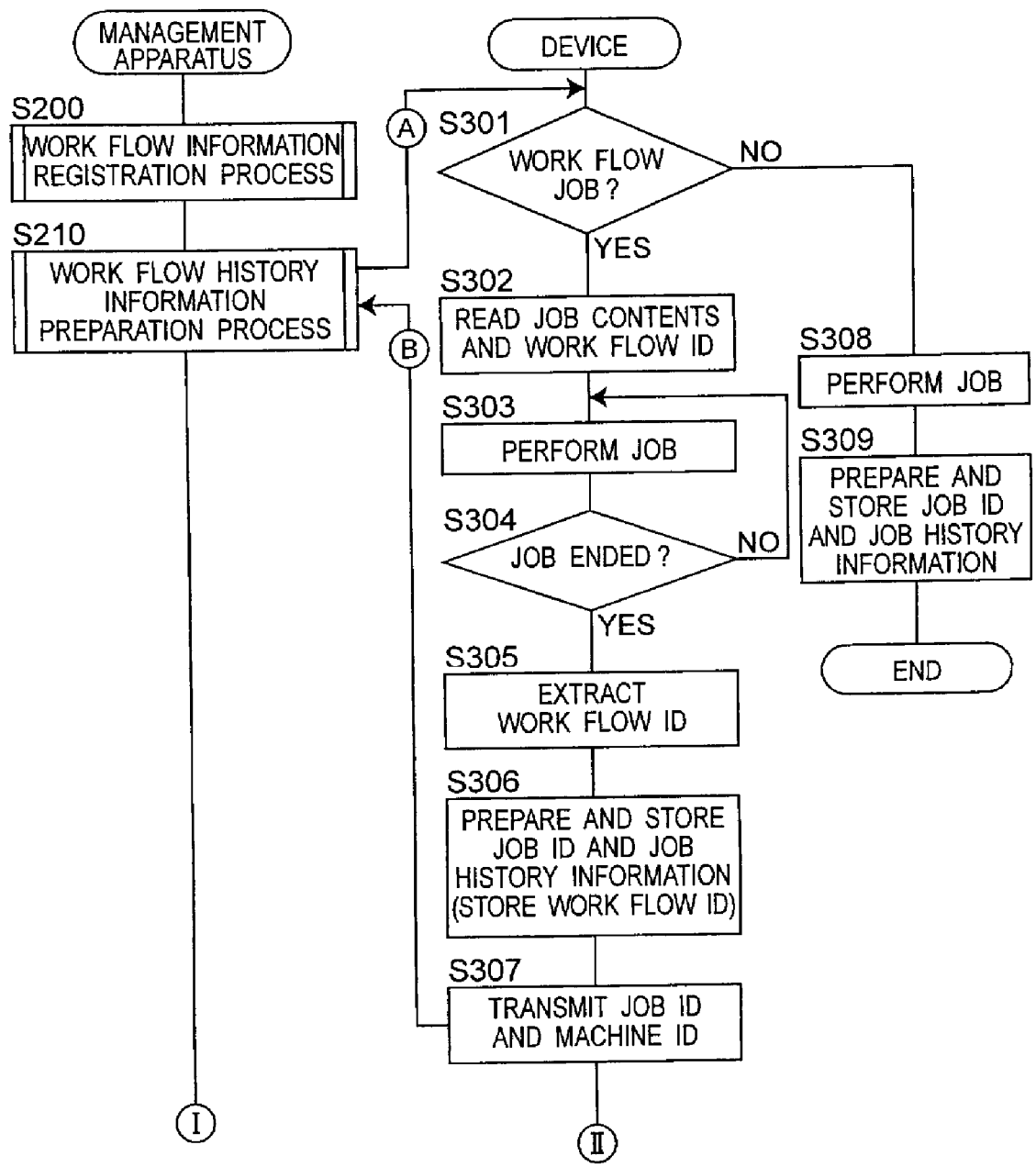
FIG. 11 is a flowchart for explaining a part of the work flow management operation carried out by the work flow management apparatus shown in FIG. 1.
Figure 13:
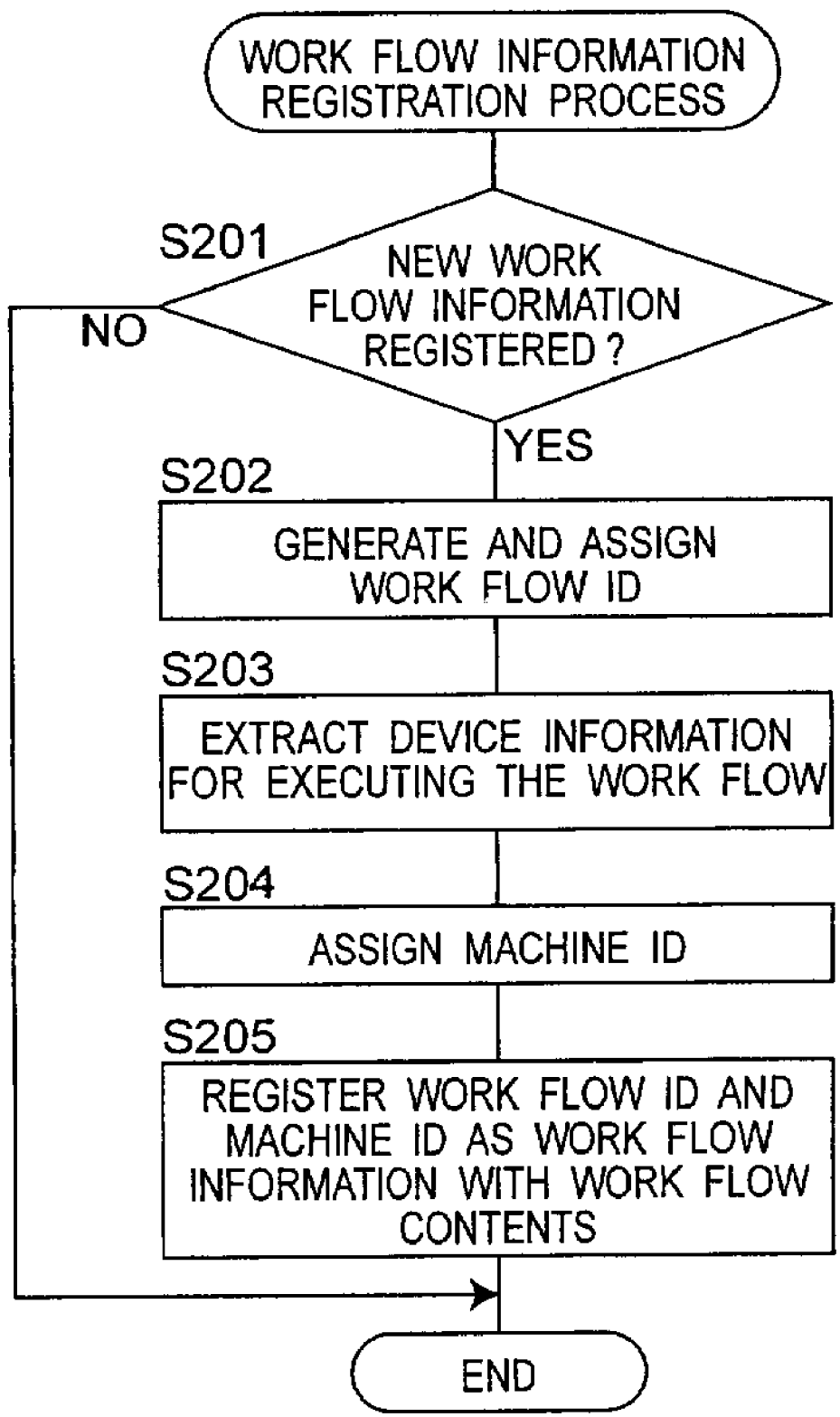
FIG. 13 is a flowchart for explaining the work flow information registration process shown in FIG. 11.

A specific operation of the work flow information registration process (S200) shown in FIG. 11 is shown in FIG. 13. The work flow information registration process is executed in the manner described below by the work flow information registration section 1113 of the work flow management apparatus 110.

First, step S201 determines whether or not new work flow information is registered. In a case where the user tries to register work flow information through the input unit 113, for example, the registration is permitted, and the process proceeds to the next step S202. At step S202, a work flow ID for specifying the work flow is generated and assigned. At step S203, the device(s) to execute the work flow is extracted from the information on the work flow input, followed by step S204 where a machine ID(s) for the device(s) is assigned. At the next step S205, the work flow information 150 shown in FIG. 7 including the work flow ID and the machine ID as well as the contents of the work flow is stored in the work flow information storage section 1121.

Figure 7:
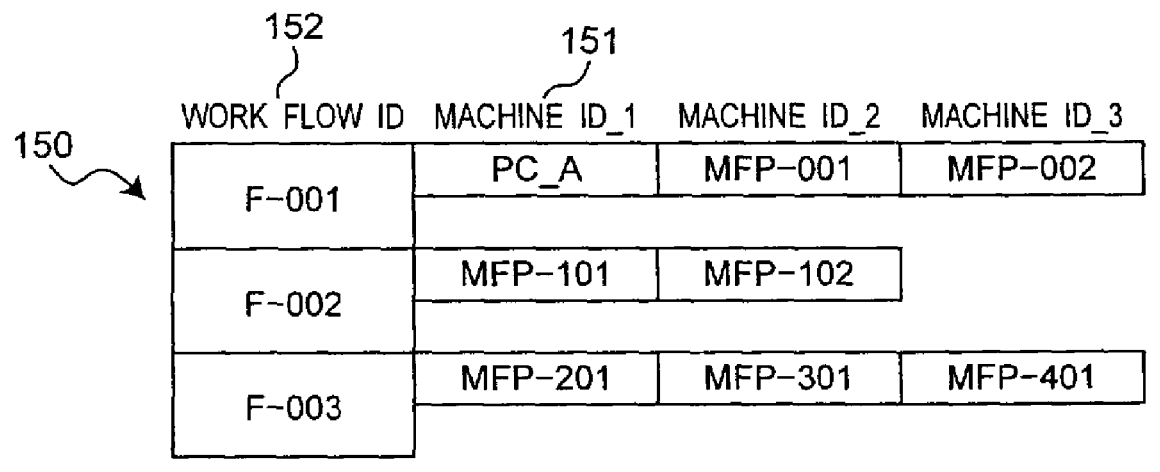

Specifically, as shown in FIG. 7, the work flow information 150 includes the machine ID 151 for each of the devices 101 and 102 and the work flow ID 152 for specifying the work flow to be executed. The machine ID 151 of the PC 101-1 shown in FIG. 1, for example, is "PC-A", and the machine ID 151 of the MFP 102-1 is "MFP-001" and the machine ID 151 of the MFP 102-2 is "MFP-002". The work flow having the work flow ID 152 of "F-001" shown in FIG. 7 represents that the work flow is executed by the PC 101-1, the MFP 102-1 and MFP 102-2 having the machine IDs 151 of "PC-A", "F-001" and "F-002", respectively. FIGS. 8A and 8B show examples of contents 155 of the job processing performed by the work flow specified by the work flow ID 152. In the work flow having the work flow ID 152 of "F-001", for example, job contents 155 performed in the MFP 102-1 are shown in FIG. 8A, and job contents 155 performed in the MFP 102-2 in FIG. 8B. Specifically, the work flow information 150 includes the job contents 155 as well as the work flow ID 152 and the machine ID 151.

Next, the work flow history information preparation process (S210) is explained. In the work flow history information preparation process, the work flow management apparatus 110 causes the device 101 and/or 102 to execute the work flow based on the work flow information 150 prepared as described above and then prepares work flow history information.

Figure 14:
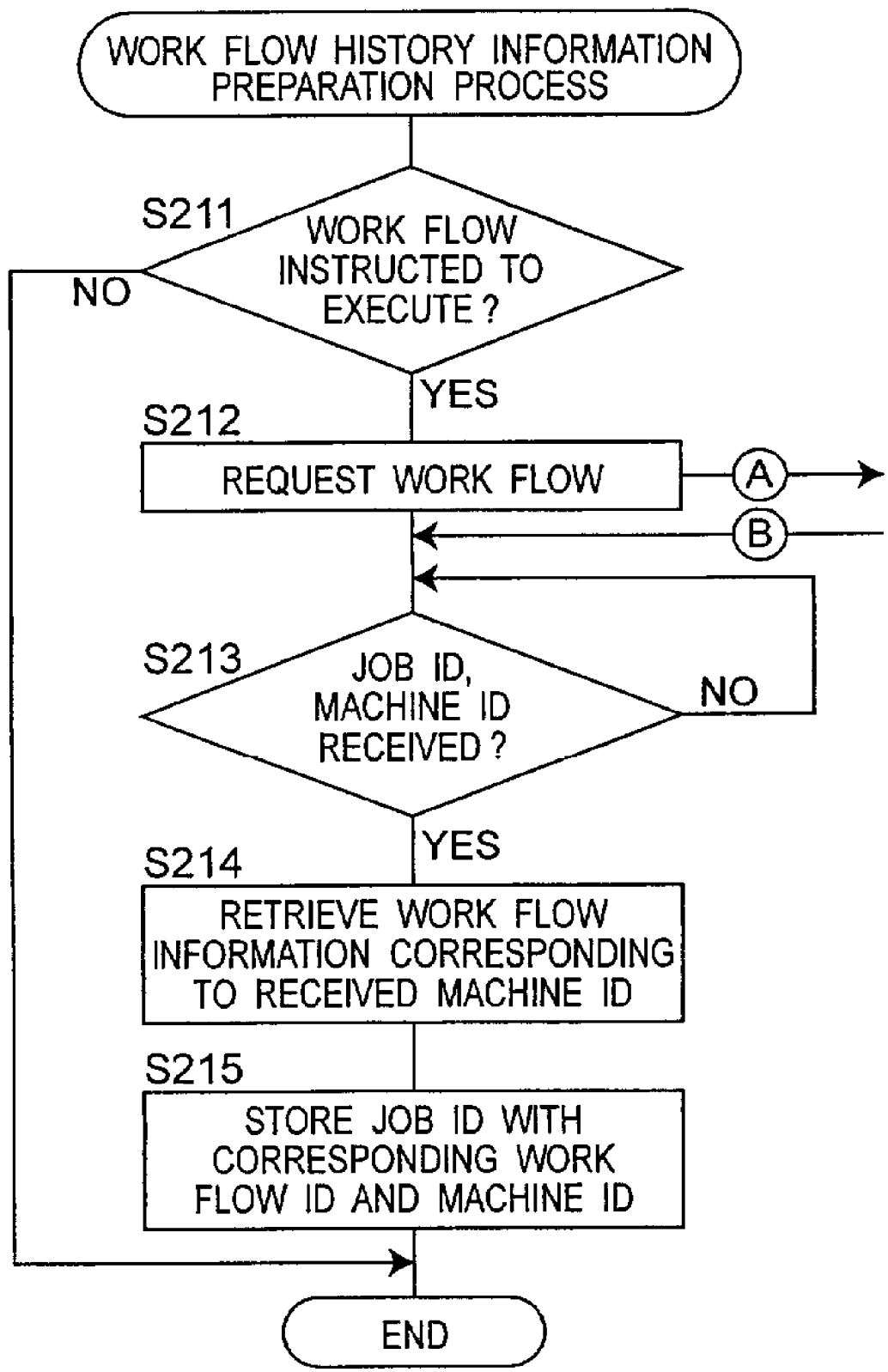
FIG. 14 is a flowchart for explaining the work flow history information preparation process shown in FIG. 11.

A specific operation of the work flow history information preparation process in FIG. 11 is shown in FIG. 14. The work flow history information preparation process is executed by the work flow history information preparation section 1112 of the processing unit 111-2 of the work flow management apparatus 110.

At step S211 shown in FIG. 14, it is determined whether or not the user has issued instructions for the device 101 and/or 102 to execute the work flow through the work flow management apparatus 110. In the presence of the instructions, the work flow management apparatus 110 sends an execution request of the work flow to the device 101 and/or 102 based on the work flow information 150 described above at next step S212. The corresponding operation of the device 101 and/or 102 for the work flow will be explained at an explanation part of the device mentioned later.

After the work flow designated on the basis of the work flow information 150 is executed by the device 101 and/or 102, step S213 determines whether or not a job ID for specifying each job executed is transmitted to the work flow management apparatus 110 from the devices 101 and 102. At the same time, the machine ID(s) 151 for the device(s) that has performed the job is also sent with the job ID. The work flow management apparatus 110, upon receipt of the job ID and the machine ID 151, searches the work flow information 150 corresponding to the received machine ID 151 at step S214. Then, at step S215, the work flow history information preparation section 1112, as shown in FIG. 9, prepares work flow history information 153 by adding the received job ID 154 to the work flow information 150, and stores the work flow history information 153 in the work flow history information storage section 1122.

Next, the operation of the devices 101 and 102 according to the work flow management method described above is explained. Processes executed by each of the devices 101 and 102 are roughly divided into a job execution process (S301 to S309) shown in FIG. 11 and a job information retrieval process (S321 to S327) shown in FIG. 12.

First, the job execution process is explained. The job information retrieval process will be explained later.

Step S301 determines whether or not a job to be performed is the one instructed by the work flow execution request issued at step S212 from the work flow management apparatus 110. Specifically, jobs to be performed by the device 101 and/or 102 are classified into a job based on the work flow execution request from the work flow management apparatus 110 and an independent job which is caused because the user demands execution of scanning of document, etc. through the MFP 102. In the case of the job based on the work flow execution request from the work flow management apparatus 110, the work flow ID 152 and the machine ID 151 together with the job contents 155 of the work flow are included in the work flow information 150, as described above. Therefore, the input information determining sections 1373 of the devices 101 and 102 determine whether or not a job received into the devices corresponds to the job based on the work flow on the basis of the presence or absence of the work flow ID 152.

In the case where the received job is determined as the job based on the work flow, the devices 101 and 102 read the work flow ID 152 and the job contents 155 of the work flow at step S302, and then perform the job designated by the work flow at step S303. At the next step S304, it is determined whether or not the job is completely performed. Upon complete performance of the job, the job ID of the performed job is prepared by the job ID preparation section 1374 at step S306, and at the same time, job history information having performance information which indicates the job contents of the performed job is prepared by the job history information preparation section 1375. The job history information may further include the work flow ID 152 corresponding to the job ID and the performance information. In such a case, the work flow ID 152 transmitted to the device 101 and/or 102 is extracted at step S305. The job history information prepared in this way is shown in FIG. 10. FIG. 10 shows the job history information 156 for the MFP 102-1. Also in the MFP 102-2 and PCs 101-1 to 101-3, each the job history information 156 is prepared and stored similarly when job is performed.

As shown in FIG. 10, the job history information 156 is shown to include the job ID 154 and the performance information 157 indicating the performed job contents. The performance information 157 contains, as shown in FIG. 10, a communication destination, communicated information such as the number of pages of a document and communication conditions or the like. FIG. 10 shows the job history information with the work flow ID 152 added thereto. The job history information 156 thus prepared is stored in the job history information storage sections 1321 of the storage units 132 of the devices 101 and 102. When the job corresponding to the work flow information is performed, the operation of storing the work flow ID 152 into the job history information storage section 1321 in the state of making the work flow ID 152 correspond to the job history information is executed by the storage control section 1376.

At step S307, the generated job ID 154 is sent to the work flow management apparatus 110 together with the machine ID 151 through the job ID transmitting unit 1379. In the process, the work flow ID 152 for the generated job ID 154 may also be sent to the work flow management apparatus 110.

Upon determination at step S301 that the received job is not the job based on the work flow, i.e. in the case where the received job is the independent job requested by the user as described above, the independent job requested by the user is performed at step S308. Then, at step S309, the job history information 156, for the independent job performed by the operation described above, having the job ID 154 is prepared, and stored into the job history information storage section 1321. In this case, the generated job ID 154 is not transmitted to the work flow management apparatus 110.

Figure 12:
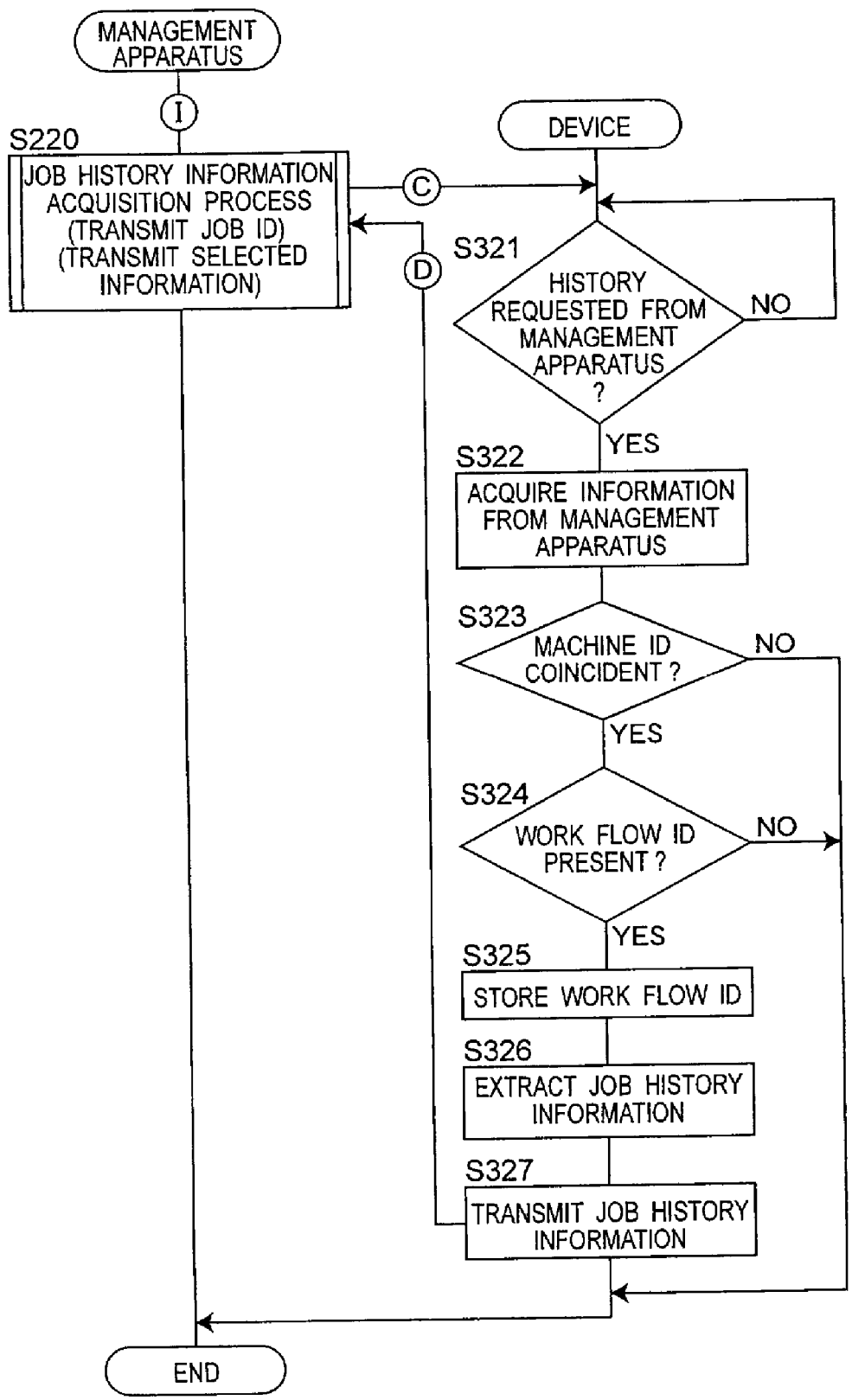
FIG. 12 is a flowchart for explaining a part of the work flow management operation carried out by the work flow management apparatus shown in FIG. 1.

Next, the job history information acquisition process (S220) by the work flow management apparatus 110 is explained with reference to FIGS. 12 and 15. As described above, the work flow management apparatus 110 is supplied with the job ID 154 of the performed job from the device 101 and/or 102 that has executed the work flow job. The work flow management apparatus 110 writes the received job ID 154 to the work flow information 150 corresponding to the job ID 154 based on the work flow ID 152 of the work flow information 150 and the machine ID 151 contained in the work flow specified by the work flow ID 152. Then, the work flow management apparatus 110 prepares the work flow history information 153 and makes it store. The devices 101 and 102, on the other hand, have each stored therein the job history information 156 corresponding to the job ID 154 and the job performance information 157 of the performed job. According to this embodiment, therefore, the job history information of the work flow in the device 101 and/or 102 can be retrieved and acquired on the basis of the work flow history information 153 stored in the work flow management apparatus 110. Specifically, the work flow executed by a plurality of the devices 101 and 102 connected to the network 103 can be managed. Thus, the job history information acquisition process is to acquire the job history information of the device 101 and/or 102 in the work flow. This job history information acquisition process can be executed, for example, to determine which job has a malfunction in the work flow process when the work flow process requested to execute is not completed.

Such job history information acquisition process is executed by the job history information acquisition section 1111 and the job history information requesting section 1114, etc. in the work flow management apparatus 110. This process is explained step by step below.

First, step S221 determines whether the job history information acquisition request is issued or not. Specifically, the process proceeds to next step S222 after the job history information acquisition request is issued by the user to the work flow management apparatus 110. In issuing the job history information acquisition request, the work flow ID 152 contained in the work flow history information 153 having the job corresponding to the desired job history information 156 is designated.

At step S222, the job ID 154 and the machine ID 151 are extracted from the work flow history information 153 of the designated work flow ID 152. At step S223, the corresponding device 101 and/or 102 is searched for based on the extracted machine ID 151, followed by step S224 to determine the presence or absence of the device 101 and/or 102. This determination of the presence or absence of the device at step S224 is to determine whether the power supply of the corresponding device is turned ON or OFF. In the case where the power supply is in OFF state, no data can be read from the job history information 156. Upon determination that the power supply is OFF, an error indicating that the job history information 156 is impossible to acquire is displayed at step S228.

Upon determination that the power supply is ON, on the other hand, the job ID 154 is sent to the corresponding device 101 and/or 102 at step S225. Specifically, the acquisition of the job history information 156 is requested. According to this embodiment, as described above, the device 101 and/or 102 involved in the work flow specified by the work flow ID 152 is extracted. Therefore, the transmitted information contains the machine ID 151 of the destination device 101 and/or 102 of course in addition to the job ID 154.

In accordance with the above-mentioned request to acquire the job history information 156, the device 101 and/or 102 searches for, extracts and sends the corresponding job history information 156. This operation will be explained later.

The next step S226 determines whether the job history information 156 is received or not from the device 101 and/or 102. Upon receipt of the information, the acquired job history information 156 is displayed on the display 114 at step S227. The job history information 156 thus acquired is stored in the job history information storage section 1123.

As a modification of the operation at step S225, select information may be sent in addition to the job ID 154 to facilitate the search and extraction of the job history information 156 in the device 101 and/or 102. The transmission of the select information is executed through the select information transmitting section 1115. The select information is at least one of the machine ID 151 and the work flow ID 152 contained in the work flow history information 153.

Next, the job information retrieval process executed by the devices 101 and 102 is explained with reference to FIG. 12. In the job information retrieval process, as described above, in response to a request issued from the work flow management apparatus 110 to acquire the job history information 156, the device 101 and/or 102 carries out the operation of searching for, extracting and transmitting the corresponding job history information 156. This operation will be explained step by step below.

Step S321 determines whether or not the device 101 and/or 102 receives a request to acquire the job history information 156 from the work flow management apparatus 110. Upon receipt of the acquisition request, the device 101 and/or 102 acquires the job ID 154 and the machine ID 151 from the work flow management apparatus 110 at step S322. At step S323, it is determined whether or not the transmitted machine ID 154 coincides with the machine ID 154 assigned to the concerned device. This determination is carried out on the input information determining section 1373. At step S324, it is determined whether the received information contains the work flow ID 152 or not. Namely, it is determined whether the job to be performed is a job for the work flow or not. This determining operation is executed on the job determining section 1380. In the case where the work flow ID 152 is contained, the work flow ID 152 is stored in the job history information storage section 1321 as a data corresponding to the job history information 156 at step S325. The operation of storing the work flow ID 152 into the job history information storage section 1321 at step S325 is not essential and is not necessary to store the data.

At step S326, the device 101 and/or 102 extracts the relevant job history information 156 from the job history information storage section 1321 on the basis of the job ID 154. This extracting operation is executed on the job history information extracting section 1377. In the extracting operation of the job history information 156, when the work flow ID 152 is stored at step S325, the work flow ID 152 may be used in addition to the job ID 154. This limits objects to be retrieved and facilitates the extracting operation.

At the next step S327, the extracted job history information 156 is sent to the work flow management apparatus 110. The transmitting operation is executed by the job history information transmitting unit 1378.

As explained above, according to the job history information acquisition process in the work flow management apparatus 110, the job history information acquisition process makes it possible to search for and acquire the job history information 156 of the devices 101 and 102 in the work flow, thereby making it possible to manage the work flow executed by a plurality of the devices 101 and 102 connected to the network 103.

The embodiment described above may assume the form of a modification described below.

Figure 15:
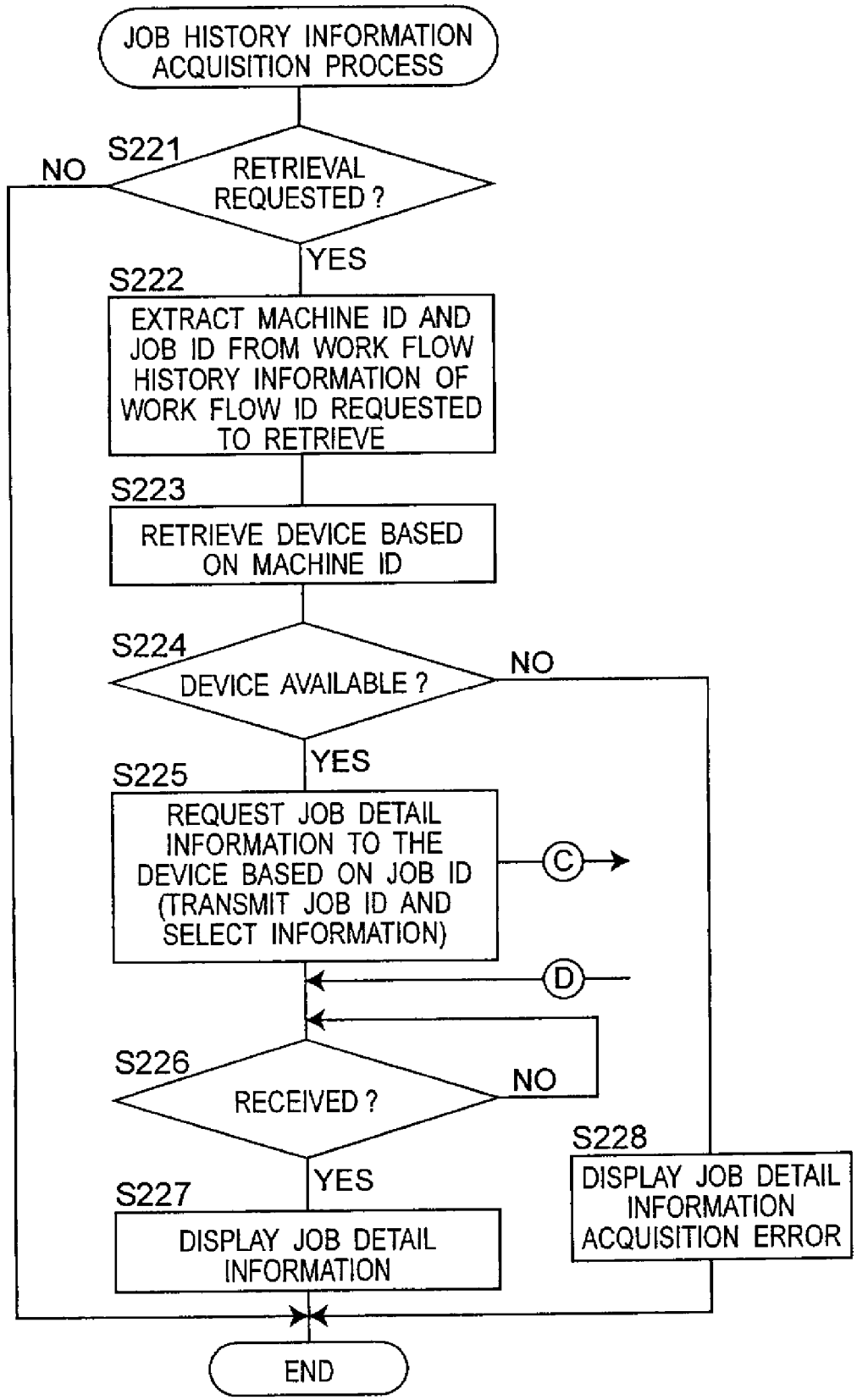
FIG. 15 is a flowchart for explaining the job history information acquisition process shown in FIG. 12.

According to this embodiment, in the job history information acquisition process shown in FIG. 15, the device 101 and/or 102 participating in the work flow specified by the work flow ID 152 is extracted as described above. Therefore the job ID 154 is transmitted to the extracted device(s) at step S225. Thus, the information transmitted naturally includes the job ID 154 and the machine ID(s) 151 of the destination device 101 and/or 102. Alternatively, however, it is possible to send only the job ID 154 to all the devices 101 and 102 making up the work flow management system 100 without specifying the devices 101 and 102.

Unlike in the embodiment described above in which the job ID 154 is transmitted to the work flow management apparatus 110 from the devices 101 and 102, the work flow management apparatus 110 may alternatively access the job history information storage section 1321 to acquire the job ID 154.

Figure 16:
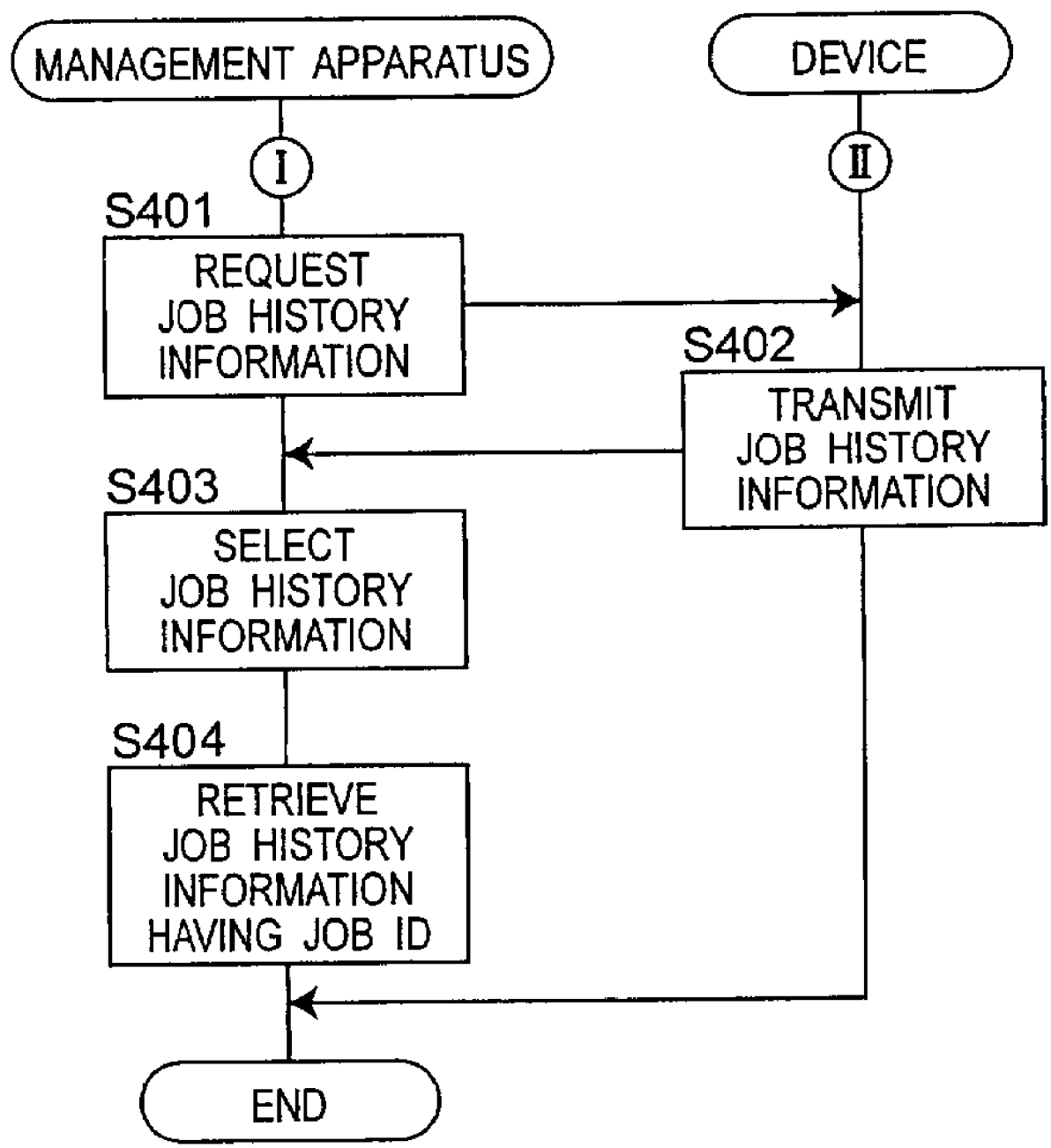
FIG. 16 is a flowchart for explaining a modification of the job history information acquisition process shown in FIG. 15.

In the embodiment described above, the work flow management apparatus 110 specifies the job ID 154 and the machine ID 151 to be sent to the device 101 and/or 102, and the relevant job history information 156 is extracted from the job history information 156 by the device 101 and/or 102 on the basis of the job ID 154. This is by reason of the fact that the in the work flow management system 100 according to this embodiment, the job history information 156 is stored in each device 101 and 102, and therefore the searching and extracting operation can be performed more conveniently at the devices. The operation to extract the job history information 156, however, is not limited to the above method. In the job history information acquisition process described above, for example, as shown in FIG. 16, a "request" instructing transmission of the entire job history information 156 in store is issued to the devices 101 and 102 from the work flow management apparatus 110 (step S401), and in response to the request, the job history information 156 are sent from the devices 101 and 102 (step S402), and then a desired job history information 156 among the received job history information 156 is extracted by the work flow management apparatus 110. As a method for extracting the desired job history information 156, for example, a selecting section 1116 of the job history information acquisition section 1111 performs the select operation using the select information of the work flow ID 152 and the machine ID 151 at step S403, and further at step S404, the desired job history information 156 can be searched for and extracted based on the job ID 154. Steps S403 and S404 may be executed in the reverse order.

Figure 17:
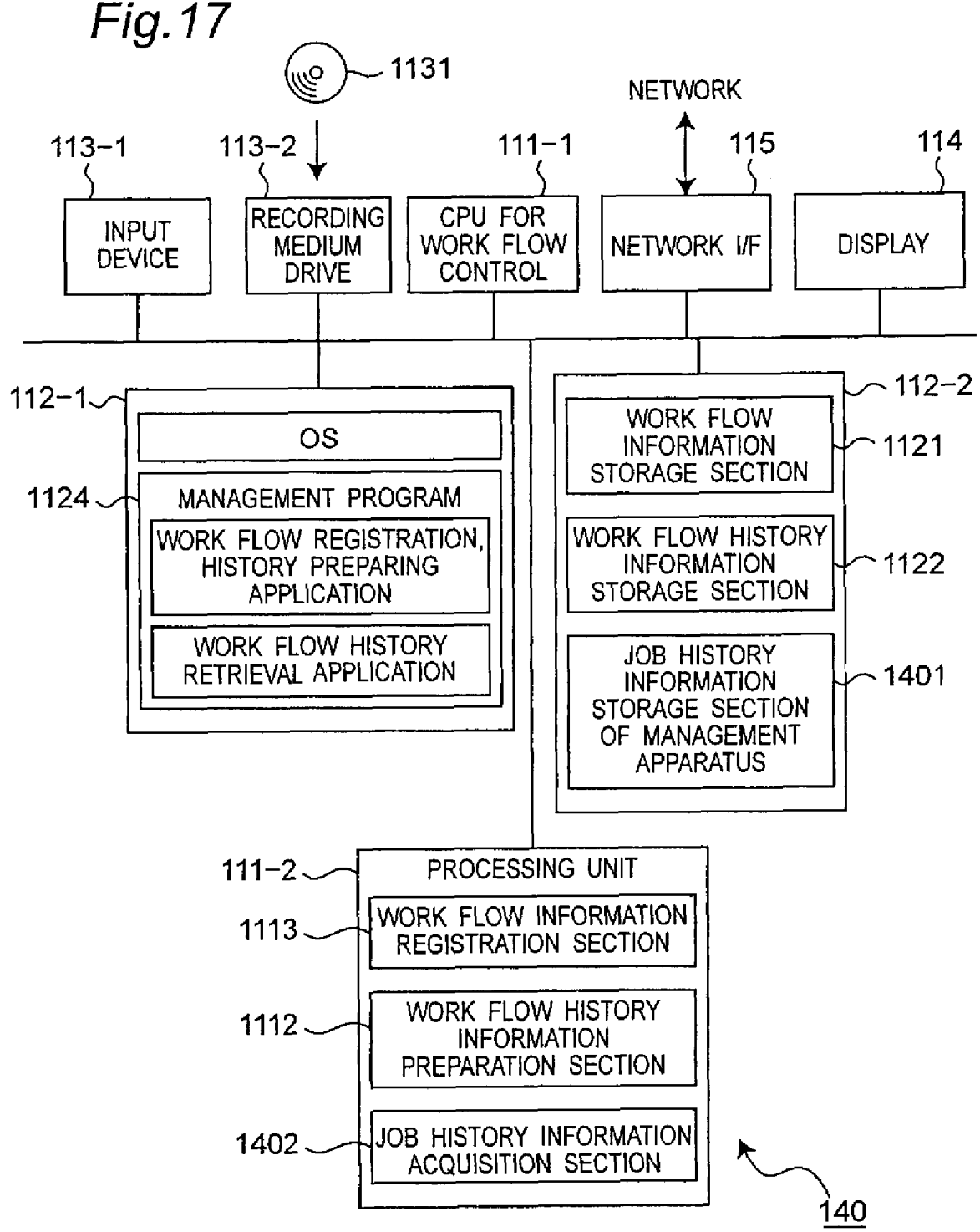
FIG. 17 is a diagram showing a modification of the work flow management apparatus shown in FIG. 3.
Figure 18:
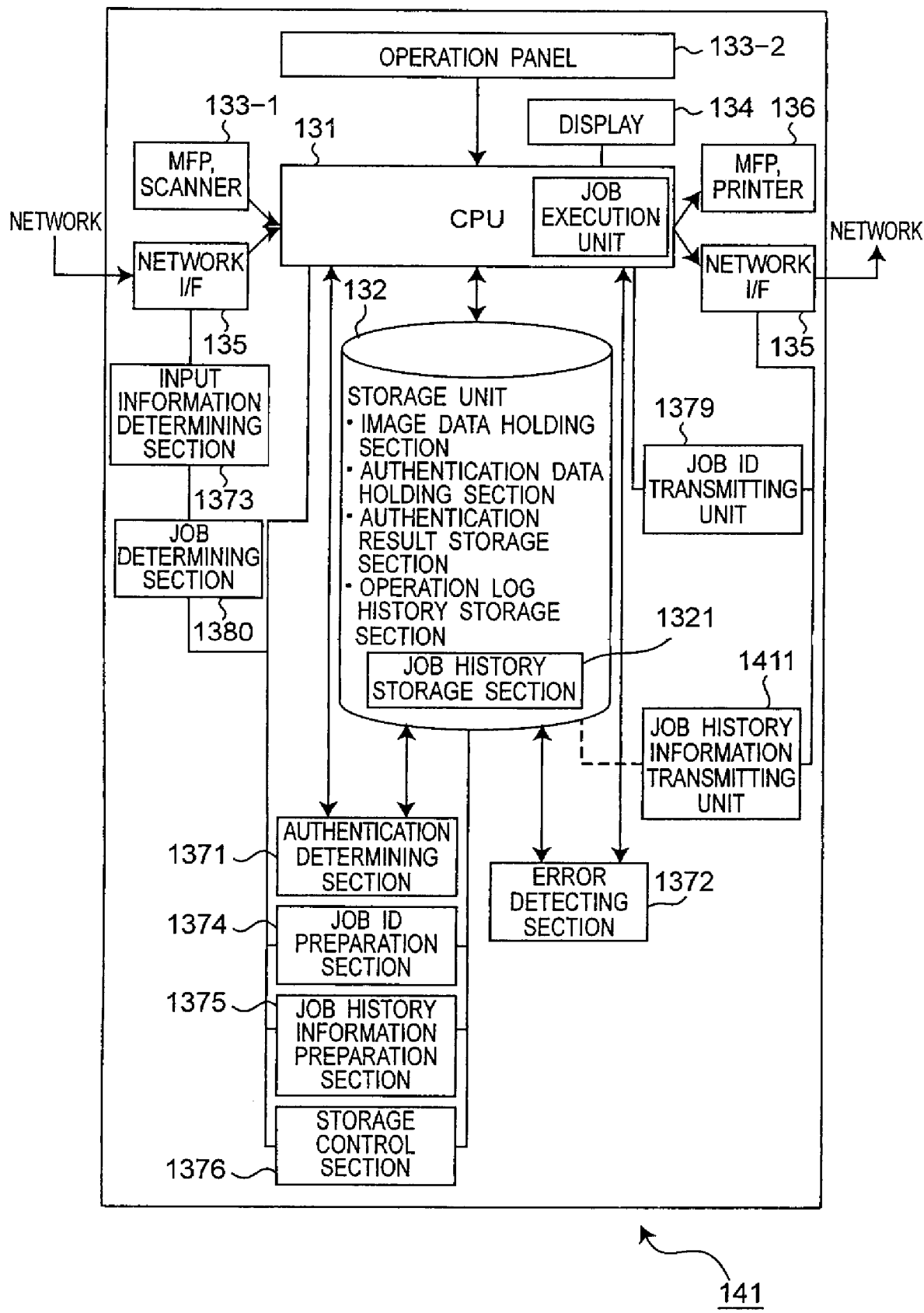
FIG. 18 is a diagram showing a modification of the devices shown in FIG. 5.

As still another modification of the operation to extract the job history information 156, it may be designed that information are not exchanged with the devices 101 and 102, but the job history information 156 prepared by the devices 101 and 102 are stored not only in the devices but also in the work flow management apparatus 110 so that the extracting operation is completed only in the work flow management apparatus 110. Specifically, for example, a work flow management apparatus 140 configured as shown in FIG. 17 and a device 141 configured as shown in FIG. 18 are used, and at step S307 shown in FIG. 11, the job history information 156 prepared at step S306, as well as the job ID 154 and the machine ID 151, are sent from the device 141 to the work flow management apparatus 140. In the work flow management apparatus 140, the job history information 156 prepared on the device 141 and stored in the job history information storage section 1321 of the device 141 is stored also in the job history information storage section 1401 of the work flow management apparatus 140. As a result, when the job history information 156 is needed, the desired job history information 156 can be extracted just from the storage unit 1401 of the work flow management apparatus 140 based on the job ID 154 and further using the machine ID 151 and the work flow ID 152 without communication with the device 141.

Although the configuration of the MFP is shown in FIG. 18, the same applies to the configuration of the PC.

In the embodiments described above, the work flow management apparatus 110 specializing in the work flow management is provided independently of the devices 101 and 102. However, the invention is not limited to such a configuration. Specifically, the work flow management system may be configured in such a manner that one of the devices including the PC 101 and the MFP 102 has the function identical or equivalent to that of the work flow management apparatus 110 described above. This configuration eliminates the need of the work flow management apparatus 110 specializing in the work flow management. As compared with the case in which the work flow management apparatus 110 independently, therefore, the cost is reduced and the space saved.

This invention is applicable to a work flow management system, and a work flow management apparatus and a method for managing the work flow.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A work flow management system comprising:
    a plurality of devices connected to a network; and
    a work flow management apparatus connected to the network and configured to manage a work flow which causes the devices to perform at least one job in collaboration with each other in accordance with work flow information which includes a work flow ID specifying the work flow and at least one machine ID specifying each of the devices that performs a job in the workflow, each job including one or more processes;
    the work flow management apparatus including:
        a work flow history information storage section configured to store work flow history information having the work flow ID, the at least one machine ID and at least one job ID specifying a performed job,
        a designation accepting section configured to accept a designation of the work flow ID,
        a job history information requesting section configured to extract the at least one job ID and the at least one machine ID from the work flow history information having the designated work flow ID, and transmit the extracted at least one job ID to the devices specified by the extracted at least one machine ID,
        a receiving section configured to receive job history information having the extracted at least one job ID from the devices specified by the extracted at least one machine ID, and
        a display section configured to display the received job history information; and
    each of the devices including
        a job history information storage section configured to store the job history information having the at least one job ID specifying the job performed by the device and performance information which indicates performed job contents,
        a job history information extracting section configured to extract from the job history information storage section the job history information having the at least one job ID sent from the work flow management apparatus, and
        a job history information transmitting unit configured to transmit the extracted job history information to the work flow management apparatus.

2. The work flow management system according to claim 1,
    wherein, each of the devices further includes a job history information preparation section configured to prepare the job history information, a job ID preparation section configured to prepare the at least one job ID, and a job ID transmitting section configured to transmit the prepared at least one job ID to the work flow management apparatus; and
    the work flow management apparatus further includes a work flow history information preparation section configured to prepare the work flow history information by adding the at least one job ID sent from the job ID transmitting section to the work flow information.

3. The work flow management system according to claim 2,
    wherein the work flow management apparatus further includes a select information transmitting section configured to transmit select information contained in the work flow history information to each of the devices.

4. The work flow management system according to claim 1,
    wherein each of the devices further includes a job determining section configured to determine whether or not the at least one job to be executed corresponds to the work flow information in accordance with presence or absence of a work flow ID specifying the work flow.

5. The work flow management system according to claim 4,
wherein each of the devices further includes a storage control section configured to store the work flow ID to the job history information storage section with the work flow ID corresponded to the job history information when each device performs a job in accordance with the work flow information.

6. The work flow management system comprising:
a plurality of devices connected to a network; and
a work flow management apparatus connected to the network and configured to manage a work flow which causes the devices to perform at least one job in collaboration with each other in accordance with work flow information having a work flow ID specifying the work flow and at least one machine ID specifying each of the devices that performs a job in the workflow, each job including one or more processes;
the work flow management apparatus including
a work flow history information storage section configured to store work flow history information having the work flow ID, the at least one machine ID and at least one job ID specifying the performed job,
a designation accepting section configured to accept a designation of the work flow ID,
a job history information requesting section configured to request the devices to transmit job history information when the designation of the work flow ID is accepted,
a receiving section configured to receive the job history information transmitted by the devices,
a job history information acquisition section configured to extract the at least one job ID from the work flow history information having the designated work flow ID and extract the job history information having the extracted at least one job ID from the received job history information, and
a display section configured to display the extracted job history information; and
each of the devices including
a job history storage section configured to store the job history information having the at least one job ID specifying the job performed by the device and performance information which indicates performed job contents, and
a job history information transmitting unit configured to transmit all of the job history information stored in the job history storage section to the work flow management apparatus when transmission of the job history information is required by the work flow management apparatus.

7. The work flow management system according to claim 6,
wherein the job history information acquisition section further includes a selecting section configured to select job history information having select information contained in work flow history information from the received job history information, and retrieve job history information having the at least one job ID from the selected job history information.

8. The work flow management system according to claim 7,
wherein the select information is at least one of the at least one machine ID specifying the device and the at least one work flow ID specifying the work flow.

9. A work flow management apparatus connected to a network and configured to manage a work flow in which a plurality of devices connected to the network perform at least one job in collaboration with each other in accordance with work flow information which includes a work flow ID specifying the work flow and at least one machine ID specifying each of the devices that performs a job in the work flow, each job including one or more processes, the work flow management apparatus comprising:
a work flow history information storage section configured to store work flow history information having the work flow ID, the at least one machine ID and at least one job ID specifying the performed job;
a designation accepting section configured to accept a designation of the work flow ID;
a job history information requesting section configured to extract the at least one job ID and the at least one machine ID from the work flow history information having the designated work flow ID, and transmit the extracted at least one job ID to the devices specified by the extracted at least one machine ID;
a receiving section configured to receive job history information having the extracted at least one job ID from the devices specified by the extracted at least one machine ID; and
a display section configured to display the received job history information.

10. The work flow management apparatus according to claim 9, further comprising:
a work flow history information preparation section configured to prepare the work flow history information by adding the at least one job ID sent from the device in which the job specified by the at least one job ID is performed to the work flow information.

11. The work flow management apparatus according to claim 9,
wherein each of the devices transmits, to the work flow management apparatus, the job history information generated at a time of executing the at least one job in accordance with the work flow information containing the work flow ID.

12. A management method carried out by a work flow management system, the work flow management system including a plurality of devices connected to a network and a work flow management apparatus connected to the network and configured to manage a work flow which causes the devices to perform at least one job in collaboration with each other in accordance with work flow information having a work flow ID specifying the work flow and at least one machine ID specifying each of the devices that performs a job in the work flow, each lob including one or more processes, each of the devices including a first storage section, and the work flow management apparatus including a second storage section, the management method comprising:
storing, at the work flow management apparatus, work flow history information having a job the work flow ID, the at least one machine ID and at least one job ID specifying the performed job in the second storage section;
accepting a designation of the work flow ID at the work flow management apparatus;
requesting, at the work flow management apparatus, a job history information by extracting the at least one job ID and the at least one machine ID from the work flow history information having the designated work flow ID and transmitting the extracted at least one job ID to the devices specified by the extracted at least one machine ID;

extracting, at each of the specified devices, the job history information having the at least one job ID sent from the work flow management apparatus from the first storage section;

transmitting, at each of the specified devices, the extracted job history information to the work flow management apparatus; and receiving, at the work flow management apparatus, the transmitted job history information.

13. The work flow management method according to claim 12, further comprising:

determining, at each of the devices, whether or not the at least one job to be executed corresponds to the work flow information in accordance with presence or absence of a work flow ID specifying the work flow at the respective device, wherein the job history information is stored in the first storage section with the work flow ID corresponding to the job history information when the respective device performs the at least one job in accordance with the work flow information in the work flow history information storing step.

14. The work flow management method according to claim 12, further comprising:

preparing the job history information at one of the devices;

preparing the at least one job ID at the one of the devices;

transmitting the prepared at least one job ID from the one of the devices to the work flow management apparatus; and preparing the work flow history information by adding the at least one job ID sent from the one of the devices at the work flow management apparatus.

15. The work flow management method according to claim 14, further comprising transmitting select information contained in the work flow history information from the work flow management apparatus to each of the devices.

* * * * *

UNITED STATES PATENT AND TRADEMARK OFFICE
CERTIFICATE OF CORRECTION

PATENT NO. : 7,743,364 B2
APPLICATION NO. : 11/164238
DATED : June 22, 2010
INVENTOR(S) : Hironobu Nakata et al.

It is certified that error appears in the above-identified patent and that said Letters Patent is hereby corrected as shown below:

Col. 15, claim 6, line 1 (of the claim), change "The" to --A--.

Col. 16, claim 12, line 15 (of the claim), delete "a job".

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,743,364 B2 | Page 1 of 1 |
| APPLICATION NO. | : 11/164238 | |
| DATED | : June 22, 2010 | |
| INVENTOR(S) | : Hironobu Nakata et al. | |

It is certified that error appears in the above-identified patent and that said Letters Patent is hereby corrected as shown below:

Column 15, line 11 (claim 6, line 1), change "The" to --A--.

Column 16, line 56 (claim 12, line 15), delete "a job".

This certificate supersedes the Certificate of Correction issued October 26, 2010.

Signed and Sealed this

Twenty-third Day of November, 2010

David J. Kappos
*Director of the United States Patent and Trademark Office*